May 17, 1960   R. McCLEARY   2,936,651
ACCELERATOR HOLD DOWN DEVICE
Filed Dec. 21, 1955   2 Sheets-Sheet 1
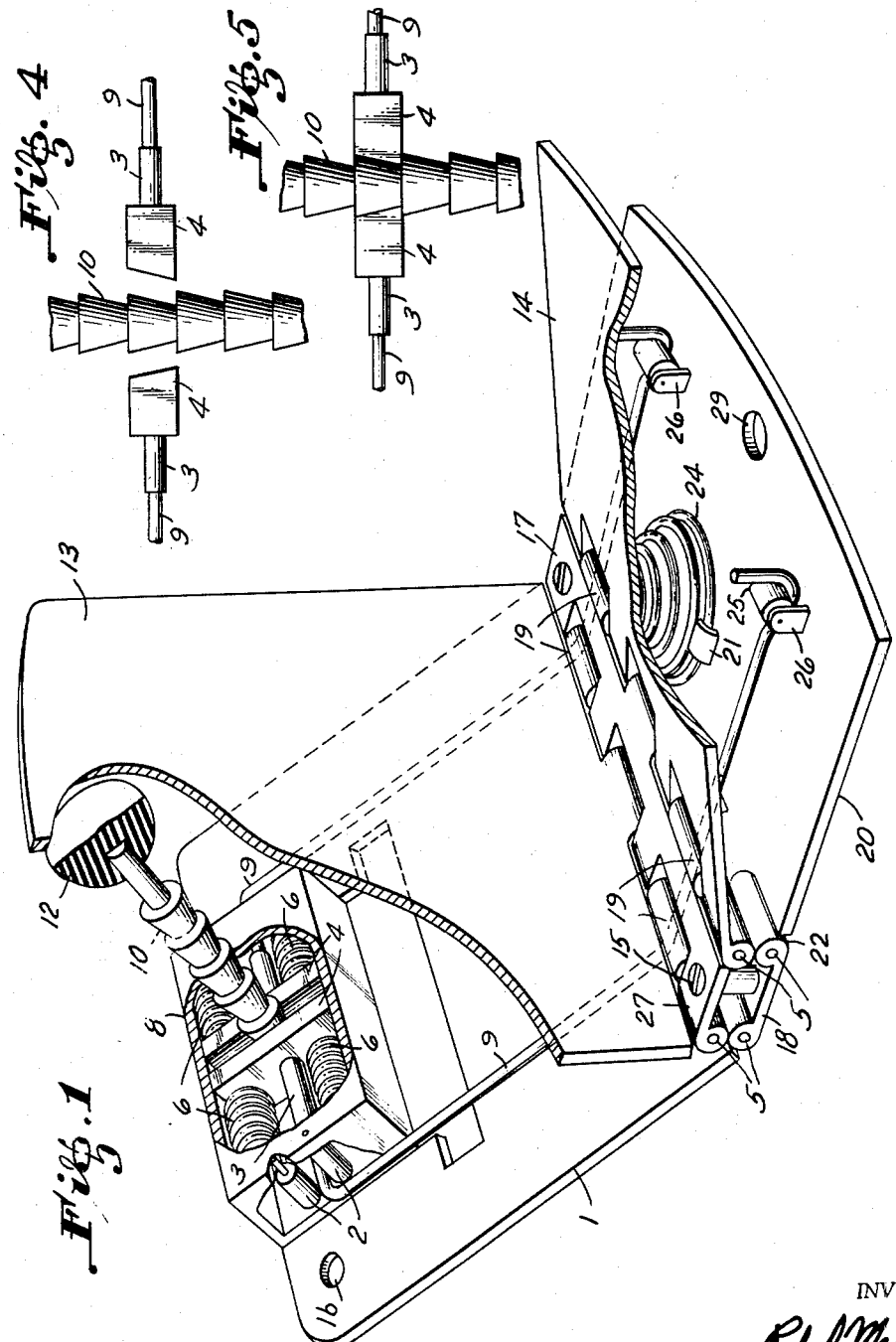
INVENTOR
Richard McCleary

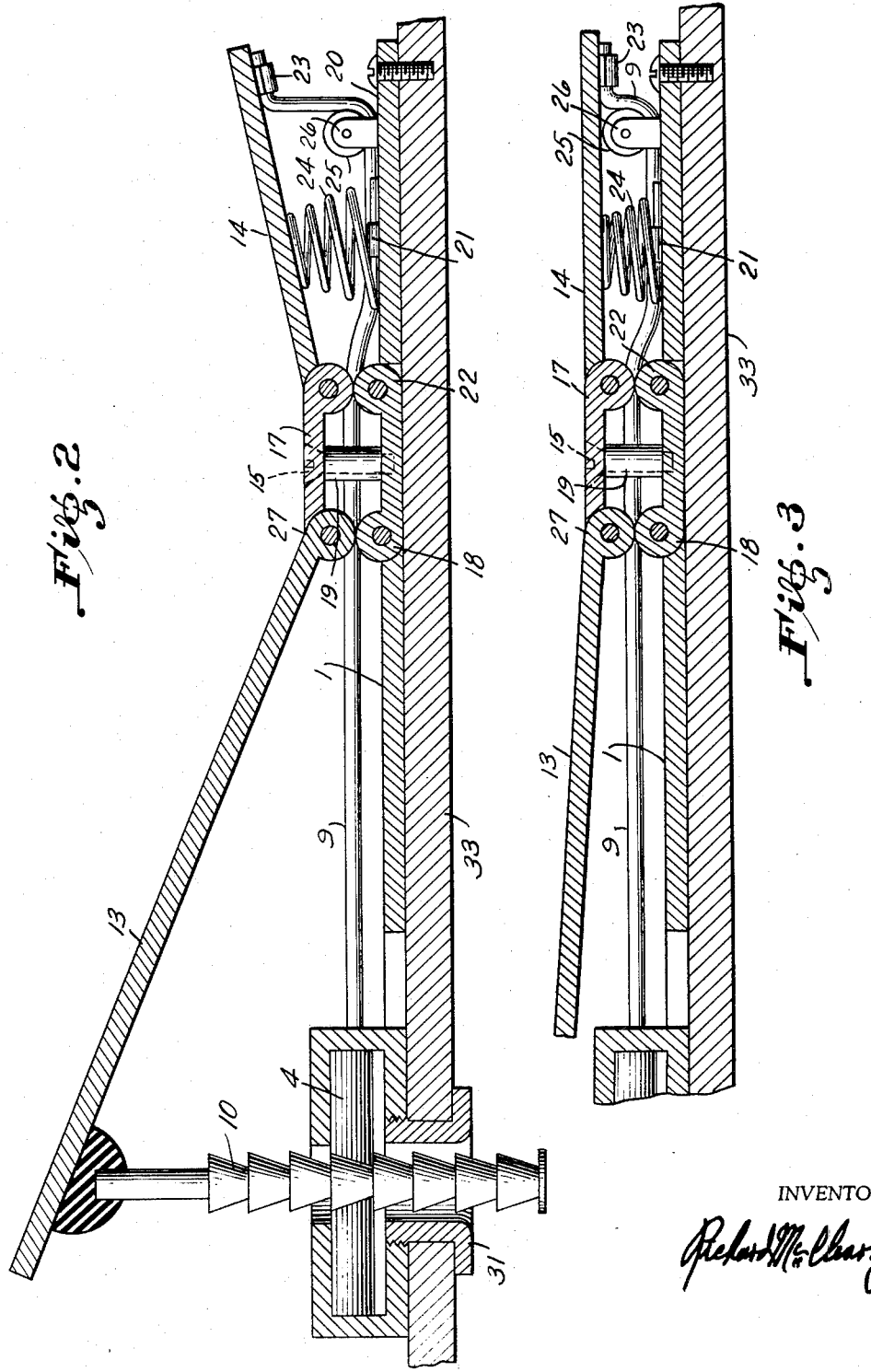

2,936,651

ACCELERATOR HOLD DOWN DEVICE

Richard McCleary, Atascadero, Calif.

Application December 21, 1955, Serial No. 554,601

1 Claim. (Cl. 74—513)

This invention relates to an accelerator control for a motor vehicle having as one of its objects the provision of an accelerator pedal hold down device in which the pedal is capable of being retained in selected positions of depression and thereby relieve the operator of the vehicle from maintaining foot pressure on the accelerator pedal.

Another object of the invention is to provide a device of the type set forth wherein means is provided for retention of the accelerator pedal in a selected position and for its subsequent release and return to an initial idling position whereby the means is subject to the control of the vehicle operator.

Another object of this invention is the provision of an accelerator pedal device which will return to an initial idling position after having been set when the operator removes his foot from the pedal, such as to apply the vehicle brakes.

Other objects and advantages of the invention will be apparent from the following description and accompanying drawings.

Referring to the drawings:

Fig. 1 is a perspective view of the accelerator pedal device with sections of the toe and heel plates removed.

Fig. 2 is a side elevation view in section with the retaining means inoperative.

Fig. 3 is a side elevation view in section with the retaining means in operation.

Fig. 4 is a detailed view of the pawls and accelerator rod with the retaining means inoperative.

Fig. 5 is a detailed view of the pawls and accelerator rod with the retaining means operative.

Referring more particularly to the drawings, a first mounting bracket 1 is adapted to be mounted on a vehicle floor pan through the use of fastening screws (not shown) and mounting holes 16. A second mounting bracket 20 is similarly adapted to be mounted on the vehicle floor pan by means of a fastening screw through mounting hole 29. The first and second mounting plates are joined by an intermediate first hinge member 18 utilizing integral hinge loops 22 and 27 and hinge pins 5. It can be appreciated that the use of hinge members adds versatility in adapting the device to vehicles with variable floor pan profiles.

A second hinge member 17 is attached to the first hinge member 18 by screws 15 and bushings 19. The first hinge member 18 is tapped to receive screws 15.

A toe plate or pedal 13 is pivotally fastened to the second hinge member 17 in a position adjacent the first mounting bracket 1. A heel plate 14 is similarly pivotally mounted on the opposite side of the second hinge member 17.

The pedal 13 supports a generally spherical rubber socket 12 adapted to receive a truncated accelerator push rod 10, the opposite end of which is attached to a conventional carburetor control linkage (not shown). The truncated surface of the rod 10 acts as a ratchet detent in cooperation with a pair of holding pawls 4.

The pawls 4 are cradled in a housing 8 for sliding movement into and out of engagement with the rod 10. Housing 8 is fastened to the floor pan 33 by means of a threaded bushing 31.

Each pawl 4 is urged into engagement with rod 10 by a pair of springs 6 acting between housing 8 and the pawl.

A pawl release means is provided by a pair of flexible cables 9 one each of which is attached to a pawl 4 by means of a sleeve 3. Each cable 9 is threaded through a pair of rollers 19 (supported on hinge pins 5) and rides over a roller 25 (supported by a pair of tabs 26 on second mounting bracket 20) and terminates at the heel plate 14 to which it is fastened by means of tabs 23.

A spring 24 attached to the bracket 20 by holding tabs 21 urges the heel plate 14 away from the bracket 20. The spring 24 is designed to exhibit a force on heel plate 14 which is greater than the aggregate opposing forces exerted by springs 6. Accordingly, when no pressure is applied to the heel plate 14, the spring 24 will overcome springs 6 resulting in disengagement of the pawls 4 from the push rod 10.

*Operation*

The initial position of heel plate 14 is in its uppermost location i.e. farthest away from bracket 20 (shown in Fig. 2) and pawls 4 are disengaged from the push rod 10 (shown in Fig. 4). The accelerator pedal 13 is urged to its uppermost position by the carburetor control linkage. The operator may use pedal 13 as a conventional accelerator pedal by resting the heel of his shoe on the hinge member 17 and applying pressure to pedal 13. The hold down feature will be inoperative in this mode.

Whenever the operator desires to utilize the hold down feature, the heel of the shoe is transferred from hinge member 17 to the heel plate 14 which permits the springs 6 to force the pawls 4 into detenting engagement with the push rod 10. The accelerator pedal will remain in the selected depressed position and thus permit the operator to remove foot pressure from pedal 13 so long as the operator retains heel pressure on plate 14. When it is desired to decelerate, the operator merely removes the heel pressure from plate 14 which disengages the hold down and permits the pedal 13 to return to its initial idling position.

From the foregoing, it will be apparent that I have provided a novel means to obtain all of the objects and advantages set forth. It will be understood that changes may be made in the details of the construction without departing from the spirit of the invention as set forth in the following claim.

I claim as my invention:

In an accelerator pedal holding device of the class described to be adapted to a vehicle having a floor pan and carburetor control linkage, said device comprising first and second mounting brackets securable to the floor pan, a first hinge member intermediately connected to said brackets so as to provide for relative angular adjustment of the brackets, a second hinge member secured to the first hinge member in substantially parallel relationship thereto, an accelerator pedal pivotally supported on the second hinge member adjacent the first mounting bracket, a heel plate pivotally supported on the second hinge member opposite the pedal, a first biasing means urging the heel plate away from the second mounting bracket, an accelerator rod connected to the accelerator pedal and the carburetor control linkage, said rod exhibiting a truncated ratchet surface, a housing secured to the floor pan, detent pawls slidable within the housing and engageable with the truncated surface, a second biasing means within the housing and urging the pawls towards engagement with the rod, means connecting the pawls with the heel plate in a manner such that depression of the heel plate will permit the pawls to engage the rod and hold the pedal in a selected depressed position.

References Cited in the file of this patent

UNITED STATES PATENTS

| | | |
|---|---|---|
| Re. 19,262 | Brandt | Aug. 7, 1934 |
| 1,436,154 | Dickerson | Nov. 21, 1922 |
| 1,475,111 | Gries | Nov. 20, 1923 |
| 1,662,211 | Shier | Mar. 13, 1928 |
| 2,484,592 | Rodd | Oct. 11, 1949 |
| 2,532,861 | Siever | Dec. 5, 1950 |